June 26, 1956  A. J. FLEMING  2,751,968
ARMREST FOR AUTOMOBILE SEATS
Filed July 31, 1953
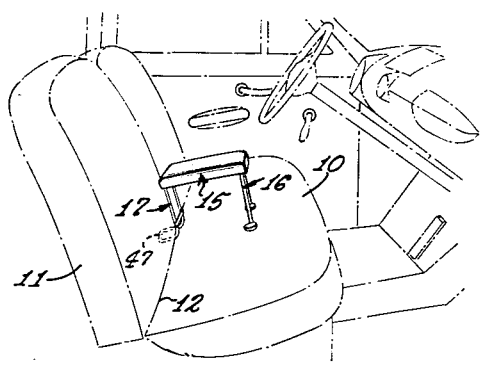
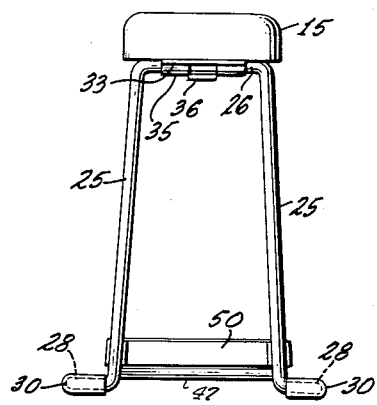
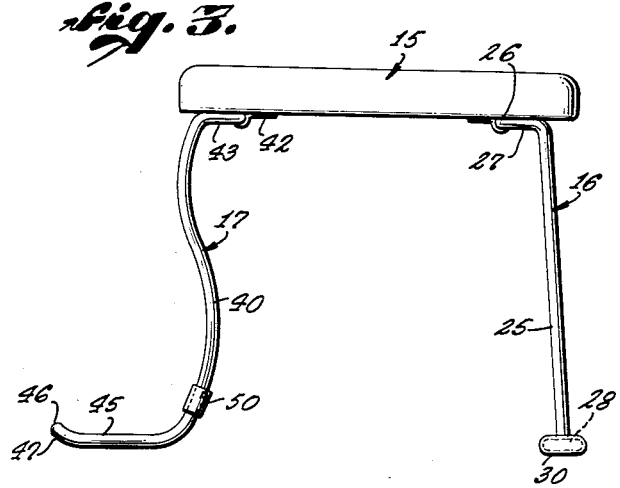
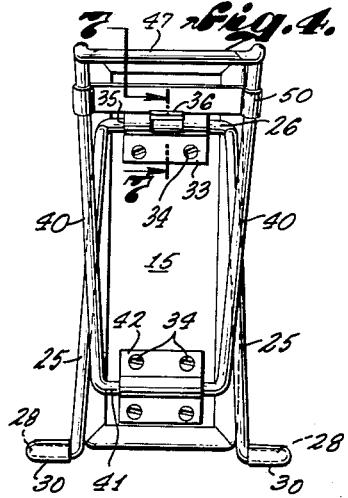
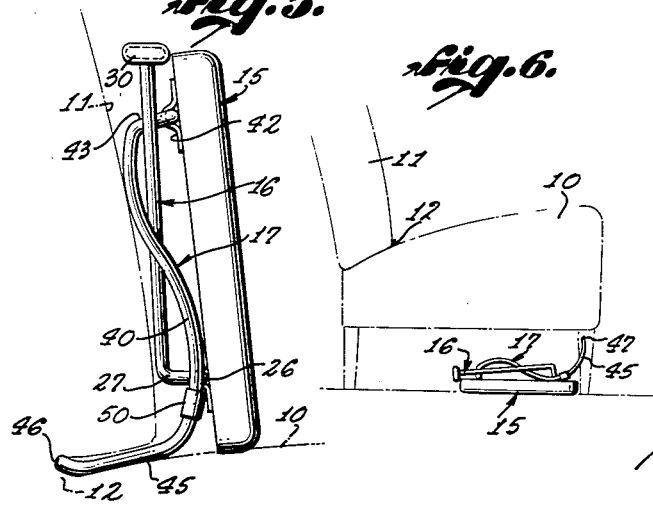
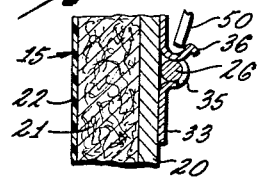
ANTIONETTE J. FLEMING, INVENTOR.
BY George J. Smyth
ATTORNEY.

United States Patent Office 2,751,968
Patented June 26, 1956

2,751,968
ARMREST FOR AUTOMOBILE SEATS
Antoinette J. Fleming, Hawthorne, Calif.

Application July 31, 1953, Serial No. 371,667

2 Claims. (Cl. 155—112)

This invention relates to an accessory device for use in automotive vehicles to serve as an armrest for either the driver or a passenger. Such an auxiliary armrest may be used to support the driver's arm for minimizing the fatigue involved in driving long distances, or may be used by passengers to enhance their comfort. An auxiliary armrest is especially useful for the comfort of a passenger riding on a seat between two other passengers. Such an auxiliary armrest is also useful at the end of an automobile seat even when there is an armrest on the automobile door, since the auxiliary armrest makes it unnecessary to impose weight on the door.

There is a definite need for an armrest of this character that may be used on any automobile without taking any special steps to adapt the arm rest to the automobile seat and without the necessity of modifying the automobile seat structure. It is desirable, moreover, that such an auxiliary armrest be adapted for storage, or at least be adapted for movement to some position out of the way of passengers when not in use. In addition, the utility of such an armrest is increased if the armrest is of a conveniently portable construction and especially if it folds into compact state and when so folded provides a convenient carrying handle.

The preferred embodiment of the invention has all of these desirable features. Broadly described the armrest comprises an elongated body with a forward leg means connected with the forward portion of the body to extend downward therefrom against the forward portion of the automobile seat cushion, and a rearward leg means to extend downward from the rearward portion of the body and rearward into the seat crevice between the seat cushion and the back rest of the seat. Both of the leg means are of foldable construction. Without removing the rearward leg means from its supporting engagement with the seat crevice, the forward leg means may be folded against the body of the armrest and then the body with the folded leg means thereon may be folded against the upright crevice-supported rearward leg means. In this manner, the folded armrest may be collapsed in upright position against the back rest of the seat and may be held in this position by engagement with the seat crevice. When the armrest is collapsed in this manner in situ, it is not ordinarily a source of discomfort to passengers seated adjacent to the device, but if it is desirable to remove the collapsed rest, it may be easily withdrawn from engagement with the seat crevice and removed from the seat for storage under the seat or in the dash compartment.

In the preferred practices of the invention, it is contemplated that each of the two leg means will comprise a single piece of suitable heavy wire bent to form a pair of legs. When the device is collapsed, one pair of legs is releasably latched to the armrest body in folded position and as so latched serves to hold the other pair of legs folded against the body. A further feature is that the wire forming one of the pair of legs also forms a convenient handle for carrying the compact folded structure.

A feature of the preferred embodiment of the invention is that various parts of the structure have multiple functions. Thus, the handle portion for carrying the device in folded state also has the function of engaging the back rest of the seat when the armrest is in use. The rear pair of legs are interconnected by a cross piece which not only braces the pair of legs but also has the useful function of frictionally engaging the back rest of the seat to oppose creepage of the rearward legs into the seat crevice and, in addition, serves as part of the latch means that holds the device in compact collapsed state. A further instance of multiple functions is the provision of a hinge member for connecting one of the pairs of legs to the armrest body, which hinge member has an integral portion thereof adapted to serve as a latch means for engaging the aforementioned cross piece.

The various features and advantages of the invention may be understood from the following detailed description considered with the accompanying drawing.

In the drawing, which is to be regarded as merely illustrative:

Figure 1 is a perspective view of the interior of an automobile showing the presently preferred embodiment of the invention;

Figure 2 is a front elevation of the armrest in position for use;

Figure 3 is a side elevation of the armrest in position for use;

Figure 4 is a bottom view of the armrest in collapsed state;

Figure 5 is a side elevation of the armrest as collapsed against the back rest of the seat;

Figure 6 is a side elevation of the armrest as stored under a seat; and

Figure 7 is an enlarged fragmentary section taken as indicated by the line 7—7 of Figure 1.

Figure 1 shows the front seat of an automobile with the presently preferred embodiment of the invention releasably mounted thereon to serve as armrest for the right arm of the driver. As shown in Figures 1 and 6, the seat structure of the automobile includes the usual seat cushion 10 and back rest 11 with the back rest positioned immediately above the rear portion of the seat cushion and resiliently impinging thereon to form what may be termed a yieldable rearwardly extending seat crevice 12. The armrest of the present invention is intended to rest on the seat cushion 10 in releasable engagement with the seat crevice 12, as shown in service position in Figure 1 and in retracted, collapsed position in Figure 5.

The armrest structure comprises a suitable elongated body 15, together with a forward leg means, generally designated 16, that is hingedly connected to the forward portion of the body and a rearward leg means, generally designated 17, that is hingedly connected to the rear portion of the body. The body 15 may be of any suitable construction but preferably is a cushion member for comfortable support of the user's arm. As indicated in Figure 7, the body 15 may, for example, comprise a base board 20 on which a mass of cushioning material 21, such as foam rubber, is retained by a sheet 22 of suitable material such as leather or a plastic substitute for leather.

The forward leg means 16 may comprise a single piece of wire bent to form two legs 25 with the two legs interconnected by what may be termed an intermediate pivot portion 26 of the wire. Each of the two legs 25 is of angular configuration as viewed in side elevation with a bent portion 27 of the wire adapted to abut the under surface of the body 15 as may be seen in Figure 3. Each of the two legs 25 is shown formed with a transverse loop 28 at its bottom end to serve as a foot and this loop may be encased in a suitable sleeve 30 of rubber or similar plastic material for contact with the surface of the seat cushion 10.

The forward leg means 16 comprising the two wire legs 25 may be hingedly attached to the body 15 in any suitable manner. In this instance, a hinge member is employed comprising a metal plate 33 that is mounted on the under surface of the base board 20 by suitable screws 34. The metal plate 33 is formed with an offset 35 that is curved cylindrically to enclose and journal the pivot portion 26 of the wire. A feature of this embodiment of the invention is that the metal plate 33 is of suitably resilient material and has a tongue 36 cut therein and bent to the shape shown in Figure 7 to serve as a latch member, as will be explained.

Each of the rear leg means 17 may also comprise a single piece of wire bent to form two legs 40 interconnected at their inner ends by a pivot portion 41. Here again, the pivot portion 41 is journaled by hinge means in the form of an offset plate 42 that is mounted on the under side of the base board 20 by screws 34. The two rearward legs 40 are also of angular configuration with bent portions 43 near their inner ends to abut against the underside of the body 15 as shown in Figure 3. Preferably the two rearward legs 40 are somewhat S-shaped in side elevation as may be seen in Figure 3, with a rearwardly bent foot portion 45 at a suitable angle to extend into the seat crevice 12. Preferably each foot portion 45 is formed with an upwardly inclined toe portion 46 to engage the under side of the back rest 11 in the manner indicated in Figure 5.

A feature of the preferred embodiment of the invention is that a portion of the wire forming the two rear legs 40 interconnects the two toe portions 45 of the legs to form a handle 47 (Figure 4). Preferably the two ends of the wire meet and are welded together to form a continuous loop. The interconnecting handle portion 47 of the wire not only serves as a carrying handle, but also provides an extensive surface for contact with the under side of the back rest 11, as may be understood from inspection of Figure 5.

Preferably the wire loop forming the rearward leg means 17 is provided with a cross piece 50 in the form of a metal strap having its ends looped around and bonded to the two rearward legs 40 respectively. The cross piece 50 has three different functions. One function is to brace the structure of the rearward leg means; a second function is to provide a downwardly presented shoulder, i. e., the bottom edge of the strap, to press against the back rest 11 for frictional engagement therewith as shown in Figure 1 to discourage downward creepage of the rear leg structure into the crevice 12 when the device is in service; and a third function of the strap is to serve as means on the rearward leg means 17 for engagement with the previously mentioned latching tongue 36 as shown in Figures 4 and 7.

A further feature of this embodiment of the invention is the manner in which the two pairs of legs diverge at their outer ends to straddle each other as shown in Figures 4 and 5. When the front pair of legs 25 is folded back against the bottom side of the body 15, the outer ends of the front legs straddle the bent inner end portions 43 of the rearward pair of legs 40; and when the rearward pair of legs is subsequently folded back against the bottom of the body 15, the outer ends of these legs straddle the bent inner end portions 27 of the forward pair of legs. This arrangement not only makes it possible for the armrest to collapse to compact folded state, but also results in the folded rearward legs 40 holding the forward legs 25 in their folded positions. As may be seen in Figures 4 and 5, the rearward legs 40 cross over the forward legs 25 to confine the forward legs against the body 15 so that latching the rearward legs 40, in effect also latches the forward legs 25.

The utility of the invention may be readily understood from the foregoing description and the drawing. When the device is in normal use as an armrest in the manner shown in Figure 1, the forward portion of the body 15 is supported by the forward legs 25 in contact with the seat cushion 10, and the rear portion of the body is supported by the rear legs 40 resting on the seat cushion in the seat crevice 12. It is apparent that it is a simple matter to place the device in service since it is merely necessary to unfold the two pairs of legs and slip the foot portion of the rear leg means into the seat crevice. It has been found that the cross strap 50 engages the resilient back rest 11 in a manner that prevents a troublesome tendency for the rear foot means to creep downward and rearward into the seat crevice when the device is in service.

The device may be collapsed out of the way against the back rest 11 without actually removing it from the seat. Thus, if the forward legs 25 are folded back against the under side of the body 15 and then the body 15 is folded down against the rearward legs 40, the armrest will assume the collapsed position shown in Figure 5. It can be seen in Figure 5 that the upward pressure of the toe portion 46 of the rear leg means 17 against the under side of the back rest 11 will tend to rock the structure counterclockwise and thus maintain the structure snugly against the back rest. When the body 15 is swung downward in this manner, the latching tongue 36 is forced into engagement with the strap 50 to latch the whole assembly in folded state.

If it is desirable to remove the arm rest from the seat, it is a simple matter to withdraw the rearward leg means 17 out of engagement with the seat crevice 12. The collapsed device effectively maintained in its compact configuration by the described latch arrangement may then be stowed away under the seat as shown in Figure 6. If the bottom of the seat is somewhat closer to the floor than indicated in Figure 6, the major portion of the folded structure will lie under the seat with the handle 47 extending upwardly in snug contact with the forward face of the seat cushion 10. It also will be convenient in many instances, to store the folded arm rest in the dash compartment of the car. By virtue of the compactness of its folded configuration and by virtue of the handle 47, the device may be conveniently carried by a passenger for use in any automobile.

My description in specific detail of a preferred embodiment of the invention will suggest to those skilled in the art various changes, substitutions and other departures from my disclosure that properly lie within the spirit and scope of the appended claims.

I claim:

1. A portable armrest for a vehicle seat having a seat cushion and a back rest overhanging the rear portion of the seat cushion and forming therewith a rearwardly extending seat crevice, said armrest comprising: an elongate body member to extend forward from said back rest at a level spaced above said seat cushion; a first leg means to rest on said seat cushion forward of said back rest to support the forward portion of said body member, said first leg means having an offset portion at its upper end extending in one longitudinal direction of the body member to lie against the underside of the body member when said leg means is in its normal supporting position; a first hinge means connecting the end of said offset portion to said body member for pivotal movement relative thereto; a second leg means to support the rear end of said body member, said second leg means having a forwardly extending offset portion at its lower end to extend into said crevice and hook under said back rest for maintaining the second leg means upright against the forward surface of the back rest; and a second hinge means connecting said second leg means to the rearward end portion of said body member.

2. A portable armrest as set forth in claim 1 which includes latch means on said body member to releasably hold said second leg means against the body member when said first leg means is folded against the body member and the body member is folded downward against said second leg means in upright position adjacent said back rest.

References Cited in the file of this patent

UNITED STATES PATENTS

| | | |
|---|---|---|
| 1,600,823 | Hess | Sept. 21, 1926 |
| 1,753,367 | Dickens | Apr. 8, 1930 |
| 1,905,219 | Crichton | Apr. 25, 1933 |
| 2,329,213 | Neutra et al. | Sept. 14, 1943 |
| 2,491,009 | Lawrence | Dec. 13, 1949 |
| 2,524,659 | Gorman | Oct. 3, 1950 |
| 2,658,560 | Cawthon | Nov. 10, 1953 |

FOREIGN PATENTS

| | | |
|---|---|---|
| 475,774 | Canada | Aug. 7, 1951 |